United States Patent
Leet et al.

(10) Patent No.: US 7,756,745 B2
(45) Date of Patent: Jul. 13, 2010

(54) METHOD FOR ACCURATELY QUOTING WAIT TIME FOR A RESTAURANT TABLE

(75) Inventors: Lee Leet, Louisville, KY (US); Brett Taylor, Alpharetta, GA (US)

(73) Assignee: QSR Automations, Inc.

( * ) Notice: Subject to any disclaimer, the term of this patent is extended or adjusted under 35 U.S.C. 154(b) by 1058 days.

(21) Appl. No.: 11/405,518

(22) Filed: Apr. 18, 2006

(65) Prior Publication Data
US 2007/0250355 A1    Oct. 25, 2007

(51) Int. Cl.
G06Q 30/00 (2006.01)
G06Q 10/00 (2006.01)
G06F 17/50 (2006.01)

(52) U.S. Cl. .......................................... 705/15; 705/7
(58) Field of Classification Search ................... 705/15, 705/2
See application file for complete search history.

(56) References Cited

U.S. PATENT DOCUMENTS

| | | | |
|---|---|---|---|
| 2004/0158494 A1* | 8/2004 | Suthar | 705/15 |
| 2005/0080650 A1* | 4/2005 | Noel | 705/2 |
| 2005/0080676 A1* | 4/2005 | Lovegreen et al. | 705/15 |

* cited by examiner

Primary Examiner—F. Ryan Zeender
Assistant Examiner—Denisse Ortiz Roman
(74) Attorney, Agent, or Firm—H. Jay Spiegel (57) ABSTRACT

The inventive method uses data received concerning the status of various tables in the establishment, the criteria provided by the customer as well as the status of the meals being prepared in a variety of courses for customers already seated to best determine how much time a new customer will have to wait before a suitable table is available where the customer may be seated. When a customer enters the restaurant, they provide information to the hostess or host including the party size and various table preferences. The host or hostess enters this information into a computer using a keyboard touch screen input or a wireless remote device. Based upon the preferences chosen by the party, the system assigns the most predictable table and periodically scans each existing table to determine that table's status. The method gains additional accuracy by obtaining detailed kitchen status information concerning meals being prepared for each table. Through determining table status and kitchen status, the system may predict "table turns," that is, when a particular table is most likely to be vacated. Periodically, once the data from all of the tables and the kitchen has been updated, the projected table turn times for each table are updated. With this updating having been accomplished, projected wait time for each party may be updated. Then, revised quoted wait times are given to customers while waiting.

20 Claims, 5 Drawing Sheets

Example

FIG. 6

METHOD FOR ACCURATELY QUOTING WAIT TIME FOR A RESTAURANT TABLE

BACKGROUND OF THE INVENTION

The present invention relates to a method for accurately calculating table turns for a restaurant table, which calculations are then used to provide accurate wait time quotes to guests on the wait list for tables. The average consumer who visits his or her favorite restaurant is likely completely unaware of the software-based automation of the dining experience that is typically used to enhance that dining experience for the restaurant's customers. From the moment the customer enters their favorite dining establishment to the moment they pay their bill and depart, Applicants' assignee, QSR's, software-based systems help the management of the restaurant determine which table is most suitable for the customer and help manage the entire experience from ordering food to preparing the food and delivering it to the table in various courses from appetizers to aperitifs to main courses, desserts and after-dinner drinks.

These software-based systems are specifically devised to enhance efficiency of the dining experience to the greatest degree and therefore to enhance profitability for the establishment.

QSR Automations Inc., of Louisville, Ky., Assignee herein, has developed a table management software it markets under the umbrella Trademark "ConnectSmart" which is known as the ConnectSmart® Hostess software. The object of the "ConnectSmart® Hostess" software is to enable a restaurant operator to successfully increase table turns and seat utilization. In the operation of the "ConnectSmart® Hostess" software, when a customer enters the restaurant and provides information to the hostess as to the number of members of the party and table preferences such as, for example, booth, table, indoor seating, outdoor seating, smoking, non-smoking, child seats required, etc., the restaurant personnel inputs this information into the system. If a table is immediately available that fulfills the customer criteria, that table is immediately suggested and assigned. If not, the customer enters a waiting list.

Based upon the preferences cited by the customer, the system eventually assigns the customer with the most predictable table, that is, the table that most closely meets the party's needs and coincides with their place in line.

The "ConnectSmart® Hostess" system periodically scans the status of each table in use so that it can predict which tables are more likely to become available, based upon configuration, history and status of the sequencing of meals.

The "ConnectSmart® Hostess" system includes a detailed display for each table which is identified including the status of each meal such as, for example, whether meals have been ordered, the status of preparing of meals, which course the diners are presently enjoying, etc. With this information in hand, it is possible for the operator of the restaurant to determine which tables are likely to become available for waiting customers and in approximate order. Through use of the "ConnectSmart® Hostess" system, all guests are waited on promptly and tables are quickly filled to enhance efficiency.

QSR Automations Inc. has also developed kitchen management software that it markets under the Trademark ConnectSmart®. The "ConnectSmart® Kitchen" system is built around the concept of virtual views consisting of a logical display of items or orders that have a common routing scheme. For each virtual view, specific routing instructions are configured, driving the items or orders to the correct virtual view. Through the use of the "ConnectSmart® Kitchen" system, kitchen workers including the chef may be provided with extremely detailed information concerning how each meal is supposed to be prepared. The pre-programmed instructions include anticipated time that it will take for each meal to be prepared so that timing of cooking can be properly managed. Thus, for example, one meal might take 20 minutes to prepare while another meal might take 10 minutes to prepare. In that circumstance, where different guests at a single table order these two different meals, the "ConnectSmart® Kitchen" system can be programmed to instruct the kitchen staff to start the first meal and then after 10 minutes have elapsed, start the second meal so that both meals are completely prepared at the same time. As is the case with the "ConnectSmart® Hostess" system, the "ConnectSmart® Kitchen" system includes a detailed display showing all of the meals that have been ordered at each table and their progress in the kitchen from the point of providing the kitchen with the order to the point at which the meals are served. The display may be formatted in any one of a number of desired configurations. The instructions as to how to preferably prepare each meal may include the ability to display graphical menu cards, which not only show the ingredients and the cooking times, but show in great detail exactly how the restaurant management wishes the meal to be presented in terms of the locations of the different components of the meal on the customer's plate. These may be described as assembly instructions. With this information in hand, a customer looking over at an adjacent table and seeing the presentation of a meal will be assured of receiving the same meal in the same presentation if they decide to order it.

While use of the "ConnectSmart® Hostess" system and the "ConnectSmart® Kitchen" system measurably enhances the efficiency and quality of the dining experience for the customers of an establishment employing these systems, even though these systems may be employed, one piece of the "puzzle" remains missing. That important piece of the puzzle involves an accurate forecast of how long it will take before the customer is actually seated at a desirable table. That issue is more commonly described as the "wait time" between the time a customer places their name on a waiting list and is actually brought to their desired table. Systems already exist for getting the attention of a customer when their table is ready. One common system consists of a plurality of visual display devices, each tastefully contained within a housing and having, typically, colored flashing lights that are activated through a signal sent from the maitre d' position at the restaurant when a table is ready (i.e., commonly referred to as a paging system). However, in such systems, the customer is only given an extremely rough idea, by the maitre d', of the projected wait time and the display devices are manually activated by the maitre d' when a table becomes available.

If it were possible to provide a customer with a more precise indication of the projected wait time and if that ability were enhanced by the ability to periodically update the wait time for the customer, a customer would have a much more accurate indication of how long they will have to wait before being escorted to their table. With such accurate information being provided, the customer may be in a better position to decide whether they wish to wait that length of time and the customer may be able to take care of various chores in the vicinity while waiting.

For example, if a customer is told that the wait time is 30 minutes, and the customer has a degree of confidence that that estimate is accurate, the customer may go shopping at an adjacent shopping center or retail establishment with confidence that they will not miss the announcement that their table is now available.

It is with these aspects in mind that the present invention was developed.

SUMMARY OF THE INVENTION

The present invention relates to a method for accurately quoting wait time for a restaurant table. The present invention includes the following interrelated objects, aspects and features:

(1) In a first aspect, an optimal manner of practicing the present invention incorporates the present invention into the QSR Automations Inc. "ConnectSmart® Kitchen" system and "ConnectSmart® Hostess" system. Of course, such interface is optional. In that mode of operation, the present invention uses data received concerning the status of various tables in the establishment based on criteria provided by the customer as well as the status of the meals being prepared in a variety of courses for customers already seated to determine how much time a new customer will have to wait before a suitable table is available where the customer may be seated.

(2) In the preferred mode of operation of the inventive system, when a customer enters the restaurant, they provide information to the hostess or host including the party size and various table preferences such as, for example, booth or table, indoor or outdoor seating, smoking or non-smoking section, number of child seats needed, etc. The host or hostess enters this information into a computer keyboard, using touch screen input or a wireless remote device. On occasions, a suitable table is immediately available. In that event, the party is immediately seated. However, often, a table is unavailable and, therefore, the party is entered into a waiting list. Entry onto the waiting list is accompanied by inputting of the party information described above as well as name and number of guests.

(3) Based upon the preferences chosen by the party, the inventive system assigns the most predictable table and periodically scans each existing table to determine that table's status. Through determining table status, the system may predict "table turns," that is, when a particular table is most likely to be vacated.

(4) In further elaboration, in evaluating the status of each table, first, the system is pre-programmed to define specific meal periods for selected times of the day, table turn times based on party size, and predicted times for each meal stage. As should be understood, meal stages include but are not limited to initial drinks, appetizers, entree, dessert, time for payment, and time to vacate the table.

(5) In the preferred embodiment, the inventive system acts to update the meal status of each table based upon kitchen events. In this regard, periodically, the status of preparation of each stage of a meal is reviewed, and it is determined whether the particular stage comprising the current table status is on-schedule according to the "ConnectSmart® Kitchen" management system. Depending upon information received, the status is updated. For example, if it appears that some items in the process of preparation are late, the system determines whether the lateness of those items will impact the predicted completion time for the meal. If so, the projected wait time may accordingly be adjusted.

(6) Periodically, once the data from all of the tables has been updated, the projected table turn times for each table are updated. With this updating having been accomplished, projected wait time for each party may be updated based upon their chosen preferences and the particular predicted wait times for tables that meet their preferences as well as when each party was added to the waiting list.

(7) The inventive system involves closely monitoring the time to begin preparation of each item, cooking times for each order, the time it takes to prepare meals and place them on the plate in the desired aesthetic placement, accommodation for delays in food preparation and processing, and delays in the time it takes for customers to order the different meal stages (or courses) and the time to eat their meals. Additional factors include circumstances in which a meal is sent back to the kitchen to be re-done or perhaps is cooked a little longer.

(8) Based upon configuration of a table, its history, and kitchen status, wait list time may be periodically recalculated and revised quoted wait times can be given to customers while waiting or may be displayed on remote display devices.

Accordingly, it is a first object of the present invention to provide a method for accurately quoting wait time for a restaurant table.

It is a further object of the present invention to provide such a system in which, in a preferred embodiment thereof, it is interfaced with a kitchen management system and a table management system for optimal effectiveness.

It is a still further object of the present invention to provide such a system in which all criteria involved in preparation and eating of a meal are inputted into a computer system as a baseline measurement and employed to help determine table wait times.

It is a still further object of the present invention to provide such a system in which the wait time may be periodically updated and provided to the customers.

It is a still further object of the present invention to provide such a system in which the statuses of respective tables in a restaurant may be continuously or periodically displayed on a display screen to allow the host or hostess to have specific knowledge concerning the statuses of the respective tables and the predictable wait times associated with each table.

It is a still further object of the present invention to provide such a system in which the preferences of each party are inputted into the system and wait times are calculated and periodically updated for each combination of preferences that has been inputted based upon the customers who are present waiting for tables.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Reference is made to FIGS. 1-4 and 6 and the following explanation of the sequence of steps employed when practicing the teachings of the present invention.

Figure 1:
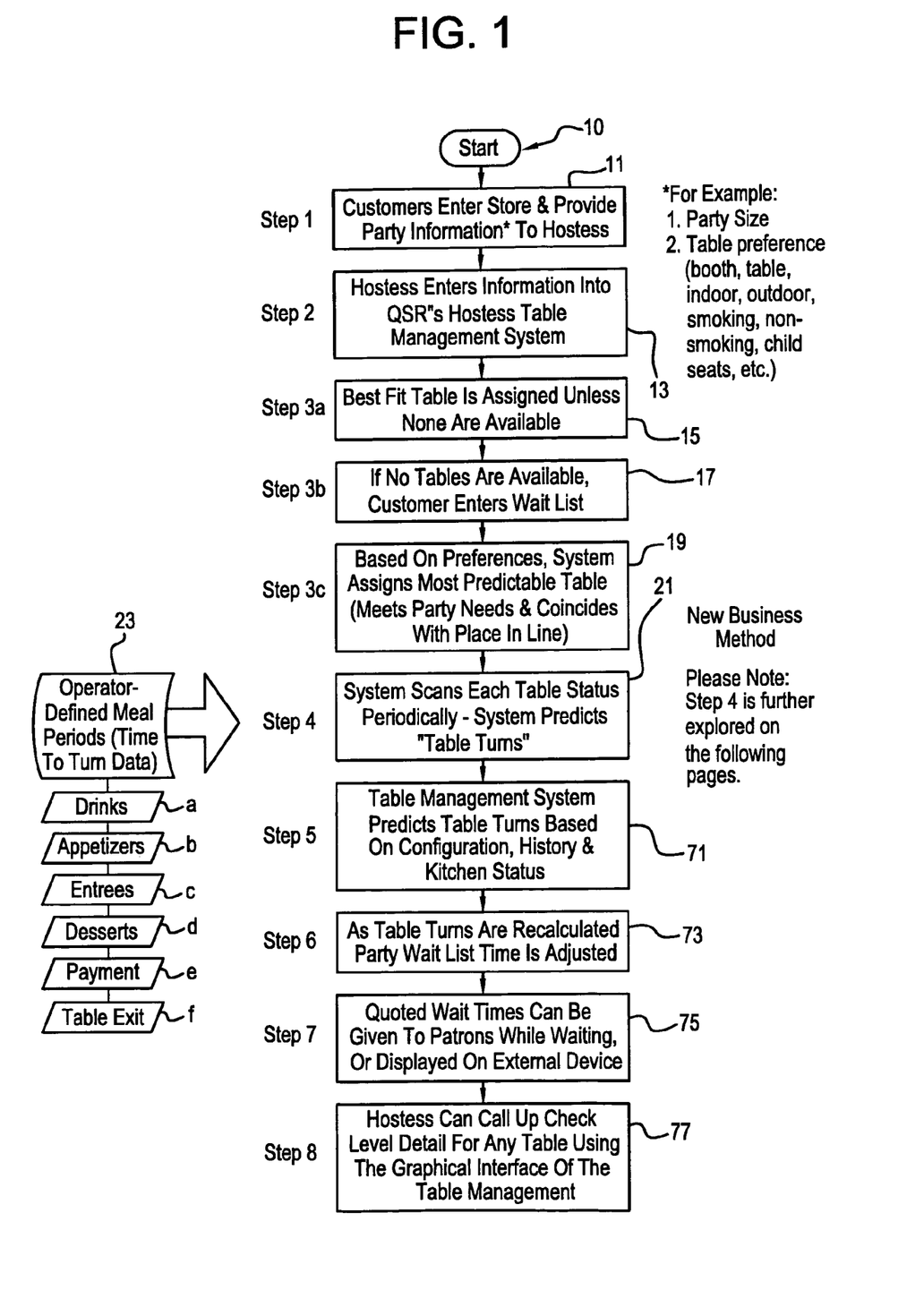
FIG. 1 shows a flowchart describing certain steps of the inventive method.

With reference, first, to FIG. 1, the beginning of the method is depicted by the oval shaped box identified by the reference numeral 10. As customers enter a restaurant or other establishment at 11, they provide a host or hostess with information concerning their party. This information may include, but is not limited to, the party name, party size and table preferences. Those preferences often include alternatives such as, for example, booth or table, indoor or outdoor seating, smoking or non-smoking section and, as an alternative, whether one or more child seats are necessary or required. At 13, once this information has been given to the host or hostess, it is entered into a table management system through the use of a keyboard, a touch screen or other suitable input means and may be displayed.

On occasion, as depicted at 15, a table meeting the party size and all table preferences is immediately available. If this occurs, that table is immediately assigned to the party. However, in the predominant majority of cases, such a table is not immediately available. In that event, at 17, the party is entered onto a waiting list. As will be explained in greater detail hereinafter, in accordance with the teachings of the present invention, when the party is entered into a waiting list, they are given the establishment's best estimate of the wait time until a table will be available.

At 19, the next step in the process is that based upon the preferences identified as depicted in box 11, the system assigns the most predictable table as the table that will likely be the one to which the party will be seated. In this regard, the system analyzes all tables that meet the required preferences and then lists them based upon which one is estimated to be available first, based upon the status of the meal that is being served to the party already sitting there. As should be understood, the characteristics of each table are pre-programmed into the system.

At this point, with every table in the establishment inputted into the system as to its status and as to its parameters for fulfilling the various parameters of actual and prospective customers, the system scans each table periodically to determine its current status and, in accordance with the teachings of the present invention, to best determine wait time before that table will again be available. In this regard, box 21 is referenced. Continuing to refer to FIG. 1, it is noted that prediction of table turns includes analysis of a good number of parameters. As identified in box 23 and the boxes a, b, c, d, e and f, among the factors that are considered in determining the time in which the table will turn is the particular stage of the meal at which measurement is being made. Those stages may include initial drinks a, appetizers and aperitifs b, entrees c, desserts d, time for payment e, and time from payment to exit f.

Figure 2:
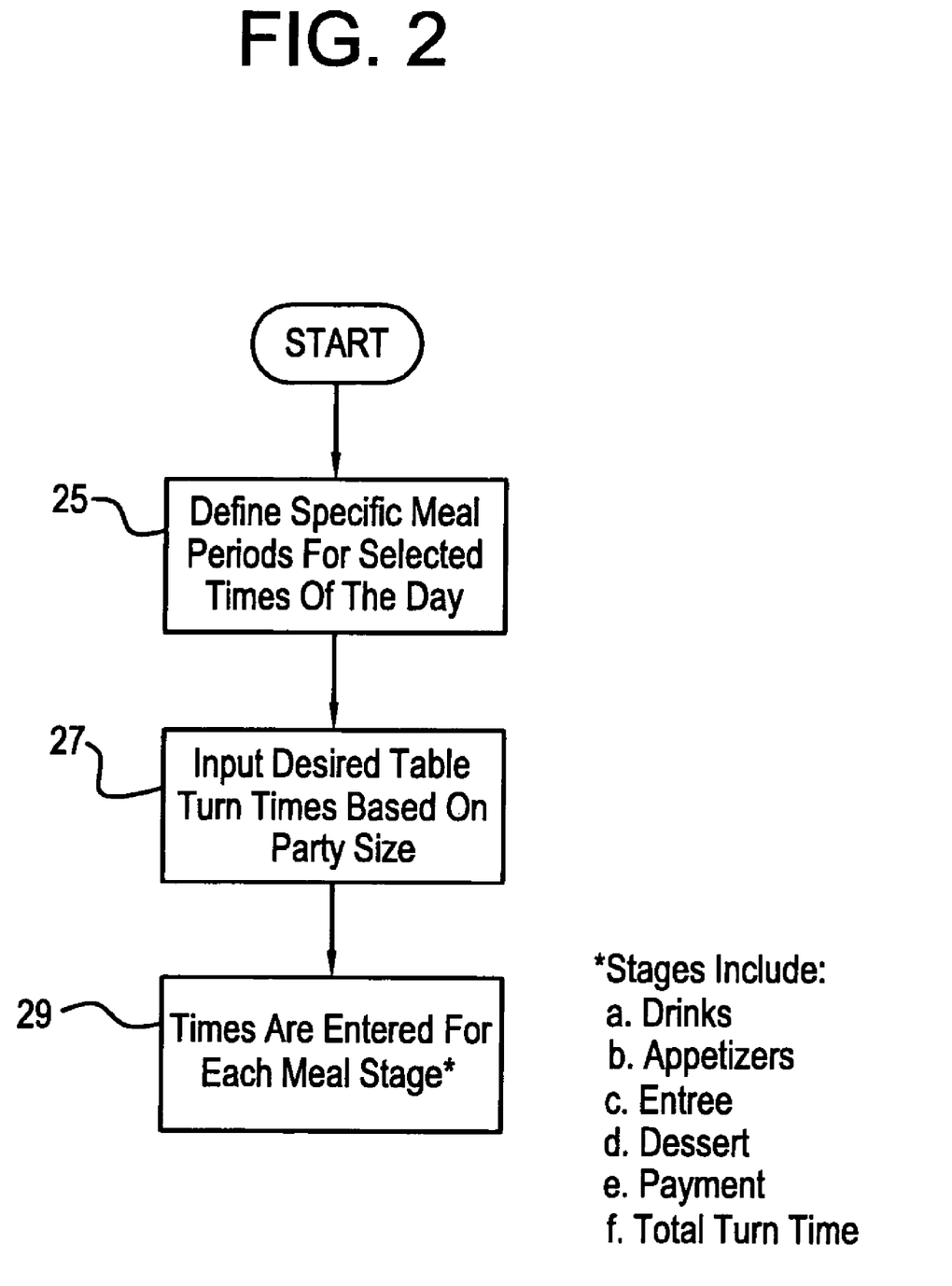
FIGS. 2, 3 and 4 elaborate upon step 4 illustrated in FIG. 1.

With reference to FIG. 2, the flowchart depicted therein is directly related to step 4 (reference numerals 21 and 23) from FIG. 1. Historically, the proprietor understands that time periods for various meals differ depending upon the time of the day. Thus, with reference to FIG. 2, one must input or automatically provide the system with the time of the day and pre-program the data as to differences in meal periods depending upon the time of the day. See reference numeral 25. Based upon determining the time of the day, an additional parameter at 27 consists of the size of the party. Although, in theory, parties at a table eat concurrently, in reality, the more people are seated at a table, the more complex the analysis becomes and, inevitably, table turn times increase. The proprietor knows this and adds a time factor depending upon the number of people seated at the table. With reference to reference numeral 29, depending upon the time of day, as understood from the above discussion, each meal stage may have a length of time that differs from other times of day and that also differs based upon the party size. This information is inputted.

Figure 3:
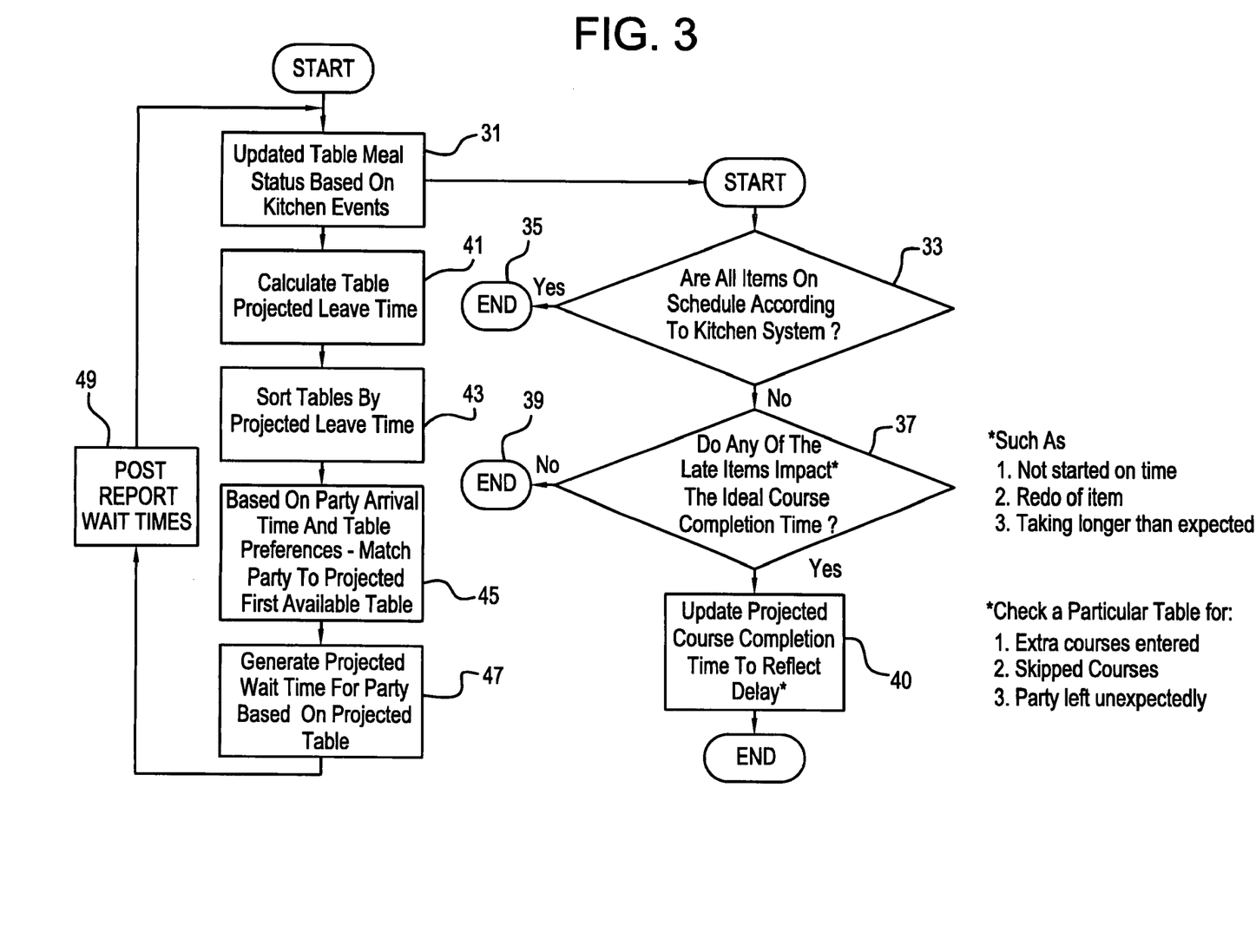

With reference to FIG. 3, the flowchart depicted therein is also directly related to step 4 and boxes 21 and 23 from FIG. 1. With reference to FIG. 3, the interrelation of the present invention to data from a kitchen management system is explained. At 31, it is understood that table meal status is updated based upon events occurring in the kitchen that are reported to the system. Thus, looking at box 33, the inquiry is made as to whether the items that are scheduled to be prepared for the particular table are being prepared on schedule. If they are, the inquiry is ended at 35. If not, the next inquiry is made as to whether any of the items that are late impact the previously calculated table turn time. In this regard, reference is made to box 37. Factors involved in determining whether any late items may impact the previously calculated table turn time include (1) that the items in question were not started at a time that was predicted, (2) that one or more items was required to be re-done, and/or (3) one or more items are just taking longer than was expected or predicted. If none of the items impact the previously predicted table turn time, the inquiry is ended at 39. If one or more of the late items will impact the previously predicted table turn time, that time is updated based upon calculation of how much time has been lost. In this regard, reference is made to box 40. Delay may also be reflected in the fact that extra courses were ordered, or on the other hand, the expected table turn time may be shortened if a party skips courses or left unexpectedly.

With further reference to FIG. 3, after the table meal status is updated based upon kitchen events in conjunction with boxes 33-40 as discussed above, it is now possible for the system at 41 to recalculate the projected table turn time for the table in question or, in other words, the projected leave time for the party. Thereafter, once the calculation has been performed for the table in question and for all other tables in the establishment, the tables are resorted at 43 based upon the newly determined projected leave times.

With reference to reference numeral 45 in FIG. 3, once all of the leave times for the tables have been calculated and updated, the system uses this information along with the previously inputted information as to arrival time of respective parties and their respective preferences to match each party to the projected first available table. With this information in hand, as explained at 47, a new projected wait time for each party can be calculated. Then, the newly calculated wait times are posted and reported at 49.

Figure 4:
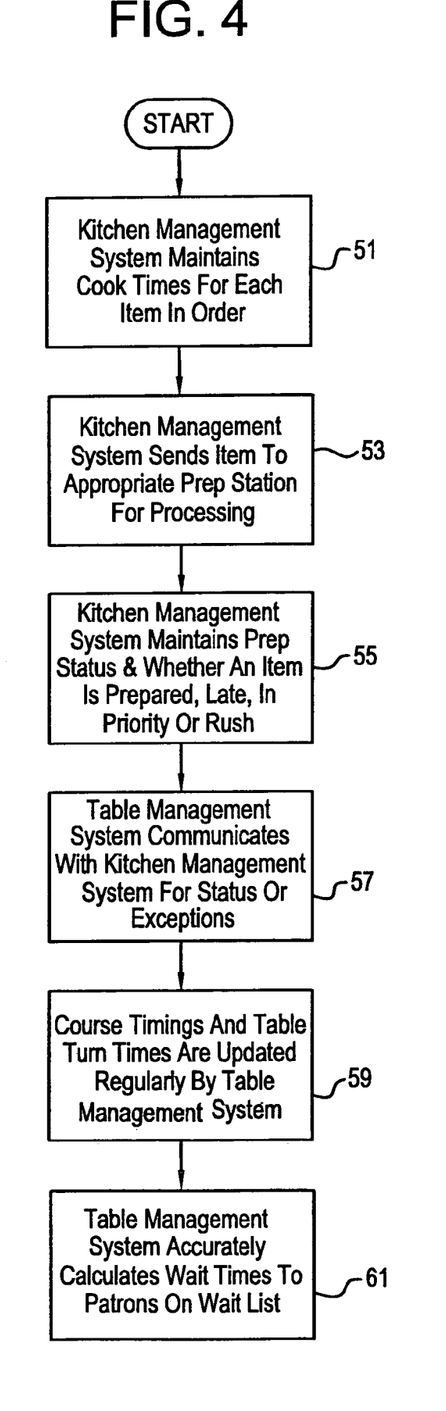

With reference to FIG. 4, an additional aspect related to boxes 21 and 23 from FIG. 1 will now be explained. As understood from FIG. 4, as part of the kitchen management system (see box 51), cook time for each item in an order is maintained based upon historical data. At 53, the kitchen software sends an item to the appropriate prep station for processing, then, the kitchen management system at 55 maintains the status of prepping of an item including whether the item has been prepared, is late in preparation, or is a priority or rush order that requires additional and quick attention. At 57, the table management system communicates with the kitchen management system to determine the status of items being prepared including exceptions to the typical processing regimen. At 59, course timings and table turn times are updated regularly by the table management system, with the table management system accurately calculating wait times to patrons on the wait list at 61.

Figure 5:
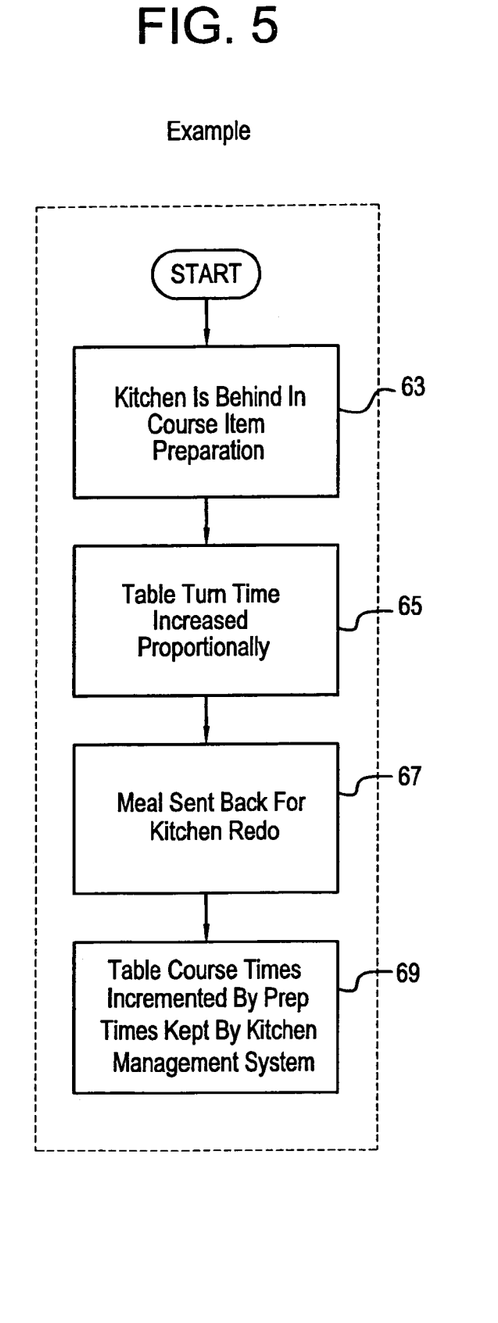
FIG. 5 shows a flowchart of an example of one aspect of the inventive method.
Figure 6:
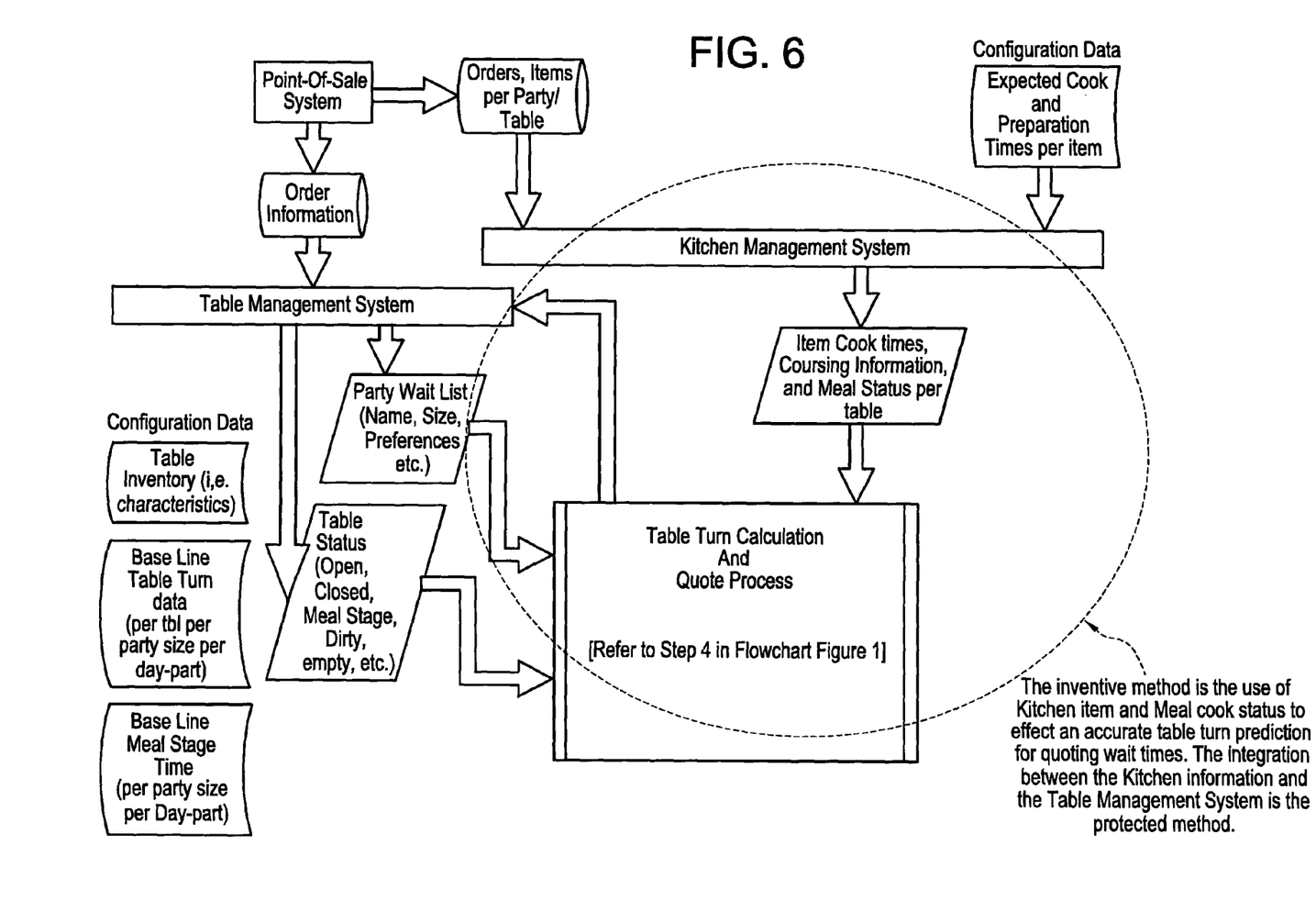
FIG. 6 shows a flowchart depicting an overview of the inventive method.

In calculating wait times based upon the parameters and data inputted, with reference to FIG. 5, if the kitchen is behind in course item preparation as depicted at 63, the system proportionally increases the calculation of the table turn time at 65. If a meal is sent back to the kitchen to be redone as at 67, then table course times are incrementally increased at 69 in accordance with recalculated prep times based upon having to redo a particular course.

With reference back to FIG. 1, based upon the data received from the kitchen management system and the table management system, table turns are predicted at 71, based upon those parameters and historical data including table configuration, history and kitchen status. Every time table turns are recalculated at 73, party wait list time is adjusted correspondingly. At this point, periodically, quoted wait times can be altered and forwarded to waiting parties as at 75, either in person or for display on a remote paging or other external device.

If desired, as at 77, the host or hostess can call up check level detail for any desired table using the graphical interface of the table management.

Thus, in accordance with the teachings of the present invention, the proprietor of a restaurant or other establishment can interface between a table management system and a kitchen management system to receive data from both and use that data to continuously update the status of each table in the establishment as to when it is predicted that table will become available for a new party and, based upon waiting parties and their preferences, which party will next receive which table and how long that process will take. In accordance with the teachings of the present invention, as explained above, the parties can have wait times frequently updated to give those parties the sense that the establishment is providing excellent service and taking care of the needs of its customers by continuously, frequently, and accurately informing them of how long it will be before they are able to be seated at a table that fits all of their preferences so that they can enjoy a custom cooked meal.

As such, an invention has been disclosed in terms of a preferred embodiment thereof which fulfills each and every one of the objects of the invention as set forth hereinabove, and provides a new and useful method for accurately quoting wait time for a restaurant table of great novelty and utility.

Of course, various changes, modifications and alterations in the teachings of the present invention may be contemplated by those of ordinary skill in the art without departing from the intended spirit and scope thereof.

As such, it is intended that the present invention only be limited by the terms of the appended claims.

The invention claimed is:

1. A method for accurately quoting wait times for restaurant tables, comprising:
   a) receiving party information concerning parties waiting for tables;
   b) recording said party information in a computerized system, said recording step comprising creating a waiting list;
   c) said system being programmed with party information criteria for each table;
   d) monitoring each table to determine status of meals served at each table;
   e) said monitoring step also including the step of checking status of order and preparation of meal stages for each table;
   f) responsive to said monitoring and checking steps, updating wait time for each table; and
   g) providing each party on said waiting list with a wait time;
   h) said computerized system being pre-programmed with first estimated time periods for preparation of various menu items and second estimated time periods for a party to remain in a particular meal stage.

2. The method of claim 1, wherein said party information includes number of people, and table preferences.

3. The method of claim 2, wherein table preferences include type of table, indoor or outdoor seating, and smoking or non-smoking section, or other completely configurable seating descriptors.

4. The method of claim 1, wherein said creating step includes the step of prioritizing parties on said waiting list by time of arrival and party information.

5. The method of claim 4, wherein said prioritizing step includes the step of comparing party information with table characteristics.

6. The method of claim 1, wherein said step of recording said party information includes the step of displaying said party information.

7. The method of claim 1, wherein said checking step includes the step of determining status of ordering and preparation of one or more courses of said meals.

8. The method of claim 7, wherein said checking step includes the step of determining whether a meal has been sent back to a preparation area to be re-done or is otherwise held up.

9. The method of claim 1, wherein said status of meals served comprises, at least in part, identification of a particular course of a meal currently served at a table.

10. The method of claim 1, wherein said computerized system is pre-programmed to update a wait time periodically.

11. The method of claim 10, wherein each time a wait time is updated, further including the step of notifying a party whose wait time has been updated of the updated wait time.

12. The method of claim 1, further comprising periodically updating said waiting list.

13. The method of claim 12, wherein said updating step is carried out responsive to receipt by said system of updated information concerning status of orders or meal stages at a table.

14. The method of claim 12, wherein said updating step is carried out responsive to receipt by said system of updated information concerning meal preparation.

15. The method of claim 13, wherein said updating step is carried out responsive to receipt by said system of updated information concerning meal preparation.

16. A method for accurately quoting wait times for restaurant tables, comprising:
   a) receiving party information concerning parties waiting for tables, party information including name of party, number of people and table preferences;
   b) recording and displaying said party information in a computerized system, said recording step comprising creating a waiting list, said creating step including the step of prioritizing parties on said waiting list by time of arrival and party information, and including the step of comparing party information with table characteristics;
   c) said system being programmed with party information criteria for each table;
   d) monitoring each table to determine status of meals served at each table;
   e) said monitoring step including the step of checking status of meal preparation for each table;
   f) responsive to said monitoring and checking steps, updating wait time for each table; and
   g) providing each party on said waiting list with a wait time
   h) said computerized system being pre-programmed with first estimated time periods for preparation of various menu items and second estimated time periods for consumption of said menu items.

17. The method of claim 16, wherein said checking step includes the steps of (a) determining status of preparation of one or more courses of said meals, and (b) determining whether a meal has been sent back to a preparation area to be re-done or is late as compared to previously recorded expected preparation times.

18. The method of claim 16, wherein said computerized system is pre-programmed to update a wait time periodically, and further wherein each time a wait time is updated, a party may be notified of said updated wait time.

19. The method of claim 16, further comprising periodically updating said waiting list.

20. The method of claim 19, wherein said updating step is carried out responsive to receipt by said system of (a) updated information concerning status of meals at a table, and (b) updated information concerning meal preparation.

* * * * *